No. 891,508. PATENTED JUNE 23, 1908.
H. TABOR & W. LEWIS.
MOLDING MACHINE.
APPLICATION FILED DEC. 19, 1905.
2 SHEETS—SHEET 1.
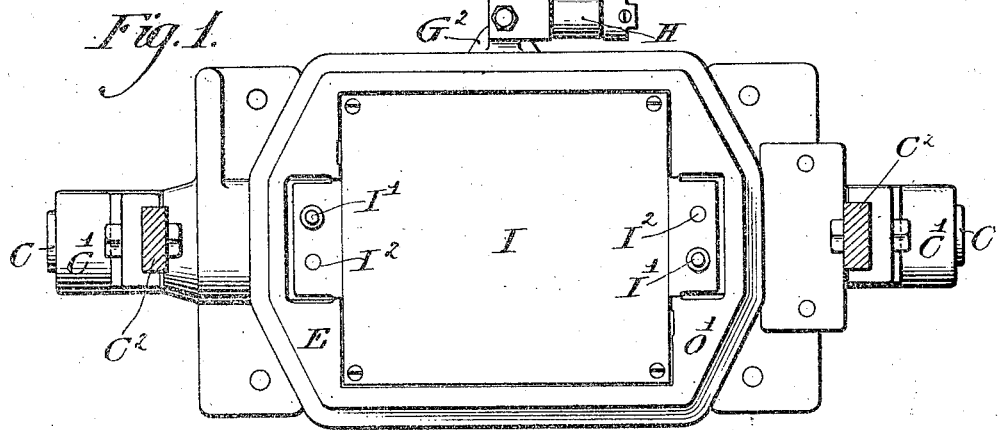
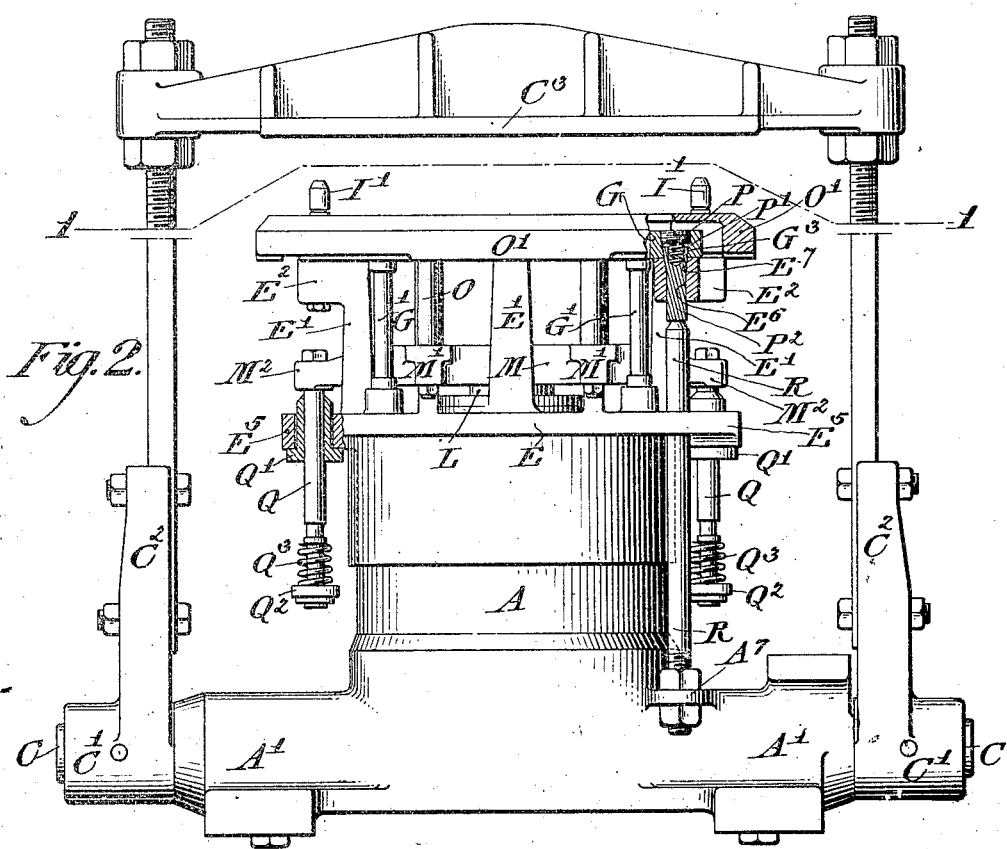
WITNESSES: INVENTORS
ATTORNEY.

No. 891,508. PATENTED JUNE 23, 1908.
H. TABOR & W. LEWIS.
MOLDING MACHINE.
APPLICATION FILED DEC. 19, 1905.
2 SHEETS—SHEET 2.
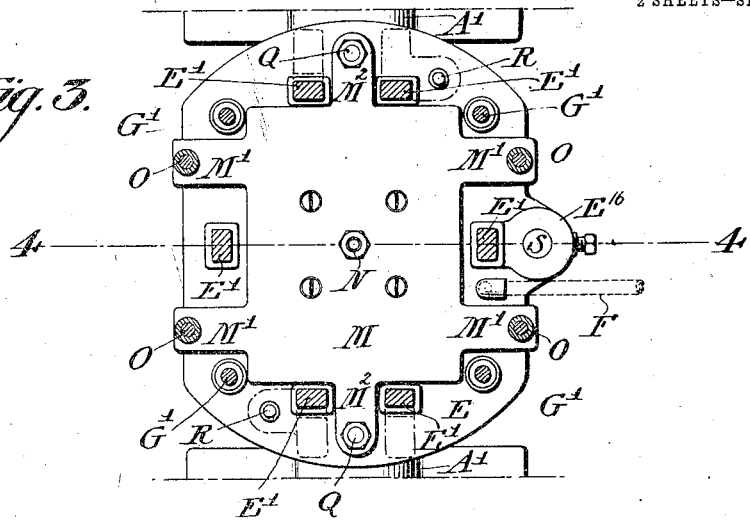
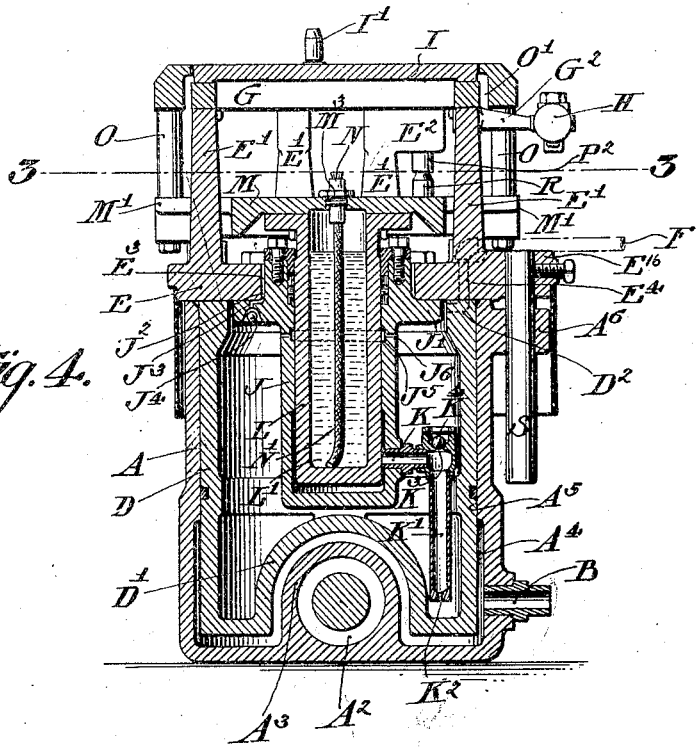
WITNESSES:
INVENTORS

UNITED STATES PATENT OFFICE.

HARRIS TABOR, OF ELIZABETH, NEW JERSEY, AND WILFRED LEWIS, OF PHILADELPHIA, PENNSYLVANIA, ASSIGNORS TO THE TABOR MANUFACTURING COMPANY, OF CAMDEN, NEW JERSEY, A CORPORATION OF NEW JERSEY.

MOLDING-MACHINE.

No. 891,508.     Specification of Letters Patent.     Patented June 23, 1908.

Application filed December 19, 1905. Serial No. 292,432.

*To all whom it may concern:*

Be it known that we, HARRIS TABOR, residing in Elizabeth, in the county of Union, in the State of New Jersey, and WILFRED LEWIS, residing in Philadelphia, in the county of Philadelphia, in the State of Pennsylvania, both citizens of the United States of America, have invented a certain new and useful Improvement in Molding-Machines, of which the following is a true and exact description, reference being had to the accompanying drawings, which form a part thereof.

Our invention relates to molding machines of the kind generally known as split pattern power ramming molding machines.

The object of our invention is to simplify and compact the structural details of such machines, and generally to improve their construction.

The nature of our improvements will be best understood as described in connection with the drawings in which they are illustrated and in which Figure 1, is a plan view of our machine with the ramming head cut away on the section line 1—1 of Fig. 2. Fig. 2, is a side elevation of our machine shown partly in section to illustrate the construction and operation of the locking pin, which, when engaged, prevents lateral movement of the pattern plate. Fig. 3, is a cross sectional view on the line 3—3 of Fig. 4, and Fig. 4, is a vertical sectional elevation on the line 4—4 of Fig. 3.

A, is the ramming cylinder, which by our construction forms essentially the base of the machine.

A', A', are lateral extensions from the bottom of the cylinder forming bearings for the shaft which supports the yoke, said bearings communicating with the transverse chamber or cavity $A^2$, formed in a rib $A^3$, extending across through the bottom of the cylinder. As shown, the lower section $A^4$, of the cylinder A, into which the pressure fluid is introduced through the pipe B, is of somewhat greater diameter than the upper section $A^5$, in which the ramming or squeezing plunger fits, the pipe B, being continued into the enlarged lower section of the cylinder so as to leave only a restricted passage between it and the bottom of the plunger D, when said plunger approaches its lowermost position $A^6$, is a perforated lug extending from the upper side of the cylinder.

C, is a shaft extending through the chambered rib in the cylinder A, and supported in the bearings A', the projecting ends of this shaft having secured to them the hubs C', C', from which extend the arms $C^2$, $C^2$, which through appropriate connections support the yoke $C^3$.

D, is the squeezing plunger working in the cylinder A, and made hollow to serve as a receptacle for fluid and also, as will be described, to receive the pattern drawing cylinder. A groove D', is formed in the bottom of the plunger to conform its shape to the rib $A^3$, and the bottom of the cylinder in which it works.

$D^2$, indicates a port by which pressure fluid is introduced and exhausted from the chamber in the plunger.

E, is the head of the plunger, through the center of which is formed the circular opening indicated at $E^3$, the head supporting the upwardly extending arms E', E', etc., some of which, at their tops, are formed with the lateral extensions indicated at $E^2$. The port $E^4$, is formed in the head as a continuation of the port $D^2$, a flexible conduit F, connecting this port with the source of fluid pressure.

G, is a frame resting on the tops of the standards or uprights E', and forming in effect a part of the pattern plate I, which is firmly secured to the frame G, in practice, the frame being made separate by preference, for reasons which will suggest themselves to those familiar with the art. This frame G, is attached to the upper ends of flexible rods G', G', etc., which rods are attached at their lower ends to the head E.

$G^2$, is a bracket extending out from the frame G, and to which is attached a vibrator as indicated at H. At two or more points conical holes $G^3$, see Fig. 2, are formed in the frame G, where it extends over lateral projections $E^2$, of the standards E', the conical perforation being continued into the standards as shown at $E^7$, terminating, by preference, in cylindrical portions $E^6$. A conical pin $P^2$, is inserted in the conical holes described, and is pressed downward by a spring P', held in place by a screw cap P, so that the action of the pins is to lock the pattern plate, through the frame G, to the standards E', so as to prevent lateral vibration or movement, the lifting of the locking pins, on the other hand, leaving the pattern plate free to vibrate laterally under the influence of the vibrator H. This lifting of the locking pins is accomplished through fingers or rods R, secured to brackets A⁷, of the cylinder A, and so placed that the ends of the pins come in contact with them when the pattern plate is in its lowermost position.

I', and I², are pins and pin holes adapted to engage the corresponding part on the flask in the usual manner.

J, see Fig. 4, is a cylinder situated within the hollow plunger D, and secured to its head through the annular flange J', the upper part of the said cylinder indicated at J², extending through the circular opening E³, in the head E, but not coming in contact with it, thus leaving an annular gutter J³, which is in communication with the reservoir in the plunger D, through a valved port indicated at J⁴. By preference, we form on the inside of the cylinder J, and near the top of the reservoir in the cylinder D, an annular groove J⁵, communicating with the reservoir space through a port or ports J⁶. A pipe K, connects the lower end of the cylinder J, with the reservoir of the cylinder D, and we have shown this pipe as having an elbow K', reaching down to the bottom of the reservoir and opening into it through a restricted passage K², a larger port K³, being provided for the escape of pressure fluid and controlled by a ball valve K⁴.

L, is a hollow plunger working in the cylinder J, and supporting at its top a plate M, which plate, through projecting lugs, M', M', etc., supports the standards O, O, to the upper ends of which is secured the flask frame O'. Other projecting lugs M², M², of the frame M, have attached to them the downwardly extending rods Q, Q, which extend through thimbles Q', in lugs E⁵, of the head E, and support through heads Q², abutment springs Q³. Another lug E¹⁶, of the head E, has secured to it the downwardly extending rod S, which extends through the perforation in the lug A⁶, as shown in Fig. 4, and prevents rotation of the plunger D, in the cylinder A.

N, is a lamp burner secured to the top of the plate M, and having a wick N', extending down into the hollow plunger L.

There is nothing essentially new in the squeezing head and its mechanism as indicated in the drawings, except in the constructive arrangement of the shaft C, with respect to the squeezing cylinder A, and we have not, therefore, further illustrated this mechanism.

It is obvious that on the introduction of pressure fluid through the pipe B, the plunger D, will be forced upward carrying with it all parts secured to and supported by the plunger, as is desirable and necessary for the ramming or squeezing function of the machine.

In practice, the reservoir space in the hollow plunger D, is partly filled with oil, the upper section of the reservoir being through the ports D², and E⁴, and the conduit F, in communication with a reservoir of compressed air. When it is desired to draw the pattern, the air is admitted into the reservoir and the oil forced through the pipe K, into the bottom of the pattern drawing cylinder J, forcing the plunger K, upward and through its head M, and the standards O, O, etc., lifting the flask frame O', above the pattern plate I. The function of the groove J⁶, is twofold. In the first place, it intercepts any oil which may be forced up between the cylinder J, and plunger L, and permits its escape back into the reservoir through the port J⁶, and, in the second place, in case any air has by accident gotten into the bottom of the cylinder J, the groove and its ports also afford a means for letting this air escape back into the reservoir. The function of the oil groove or gutter J², is to intercept any oil which may escape from the top of the cylinder J, such intercepted oil being permitted to flow back into the reservoir through the valved port J⁴, when the reservoir is not under pressure.

The utilization of the hollow plunger L, as a lamp reservoir to feed the burner N, below the pattern plate, has obvious advantages. The other details of the mechanism illustrated, their functions and modes of operation are sufficiently obvious and clear in view of the description already given.

Having now described our invention, what we claim as new and desire to secure by Letters Patent, is:

1. In a molding machine a squeezing cylinder having a transverse closed chamber formed through its base, extending into the cylinder, and connecting with shaft bearings formed in lateral extensions of the cylinder, in combination with a shaft passing through said chamber, and supported in said bearings, a squeezing head connected to said shaft and a squeezing plunger working in the cylinder.

2. In a molding machine a squeezing cylinder having a transverse perforated rib extending through its bottom in combination with a shaft passing through said perforation, a squeezing head connected to said shaft and a squeezing plunger working in the cylinder and having its bottom conformed to that of said cylinder.

3. In a molding machine the combination of a stationary cylinder, a squeezing plunger working therein, a pattern drawing cylinder contained in said plunger and a plunger working in said pattern drawing cylinder.

4. In a molding machine the combination of a cylinder, a squeezing plunger working therein and made hollow to form a reservoir for fluid, a cylinder supported by the squeezing plunger and extending inside the same, a port connecting said cylinder with the reservoir in which it is inserted, means for introducing and withdrawing pressure fluid to and from the reservoir of the squeezing plunger, and a pattern drawing plunger working in the cylinder carried by said plunger.

5. In a molding machine the combination of a cylinder, a squeezing plunger working therein, a pattern drawing cylinder contained in said plunger, a hollow plunger working in said pattern drawing cylinder, and a lamp burner opening from the hollow pattern drawing plunger below the pattern plate.

6. In a molding machine, a hollow squeezing plunger and a pattern drawing cylinder secured to and extending within the squeezing plunger, a piston working in said cylinder, said plunger being formed with a liquid catching groove surrounding the pattern drawing cylinder, and a passage connecting said groove with the interior of said plunger, a valve in said passage, and means for supplying liquid under pressure to the interior of said cylinder to move said piston relative thereto.

7. In a molding machine, a hollow squeezing plunger, a pattern drawing cylinder secured to and extending within said plunger, said cylinder being formed with an annular groove $J^5$ in its inner surface above its lower end, and a port or ports leading from said groove to the interior of the squeezing plunger, a piston working in said cylinder, and means for supplying liquid under pressure to the interior of said cylinder at its lower end.

8. In a molding machine, conical locking pin or pins for connecting the pattern plate to the pattern drawing mechanism so as to prevent lateral movement thereon, in combination with a spring acting to seat said pin, and a fixed pin raising finger placed to contact with and disengage said pin when the plate is in lowermost position.

HARRIS TABOR.
WILFRED LEWIS.

Witnesses:
ARNOLD KATZ,
D. STEWART.